US009274013B2

(12) United States Patent
Chau et al.

(10) Patent No.: US 9,274,013 B2
(45) Date of Patent: *Mar. 1, 2016

(54) TENSION MONITORING ARRANGEMENT AND METHOD

(71) Applicant: Merlin Technology Inc., Kent, WA (US)

(72) Inventors: Albert W. Chau, Woodinville, WA (US); Rudolf Zeller, Seattle, WA (US); John E. Mercer, Gig Harbor, WA (US); Charles Yu Yat Tsang, Renton, WA (US)

(73) Assignee: Merlin Technology Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,929

(22) Filed: Aug. 2, 2013

(65) Prior Publication Data
US 2013/0319136 A1 Dec. 5, 2013

Related U.S. Application Data

(60) Continuation of application No. 13/251,807, filed on Oct. 3, 2011, now Pat. No. 8,499,646, which is a continuation of application No. 12/835,100, filed on Jul. 13, 2010, now Pat. No. 8,042,407, which is a
(Continued)

(51) Int. Cl.
*G01N 3/08* (2006.01)
*G01L 1/26* (2006.01)
*B66C 13/16* (2006.01)
*B66C 23/90* (2006.01)
*B66D 1/54* (2006.01)
*G01L 5/10* (2006.01)

(52) U.S. Cl.
CPC . *G01L 1/26* (2013.01); *B66C 13/16* (2013.01); *B66C 23/905* (2013.01); *B66D 1/54* (2013.01); *G01L 5/103* (2013.01)

(58) Field of Classification Search
CPC .................................. G01L 1/26; G01L 5/103
USPC ..................................................... 73/760, 826
See application file for complete search history.

(56) References Cited

U.S. PATENT DOCUMENTS

| 3,823,395 | A | | 7/1974 | Rigney et al. |
| 3,876,972 | A | | 4/1975 | Garrett |
| 4,316,702 | A | | 2/1982 | Kiowski et al. |
| 4,461,459 | A | | 7/1984 | Conti |
| 4,551,730 | A | * | 11/1985 | McTamaney et al. ... 346/33 WL |
| 4,780,910 | A | | 10/1988 | Huddleston et al. |

(Continued)

Primary Examiner — Max Noori
(74) Attorney, Agent, or Firm — Pritzkau Patent Group, LLC

(57) ABSTRACT

Tension monitoring is described using a sensor which may exhibit an offset for which compensation may be provided to produce a zero voltage amplified output or to increase dynamic range. An arrangement determines whether a power reset is responsive to a battery bounce such that an initially-measured system start-up parameter can be retained. The start-up parameter is automatically saved at start-up if the power reset is responsive to a start-up from a shut-down condition. The start-up parameter may be a zero tension amplified output responsive to the sensor offset at zero tension. Protection of a tension data set is provided such that no opportunity for altering the data set is presented prior to transfer of the data set. A housing configuration forms part of an electrical power circuit for providing electrical power to an electronics package from a battery.

14 Claims, 7 Drawing Sheets

Related U.S. Application Data continuation of application No. 12/506,986, filed on Jul. 21, 2009, now Pat. No. 7,775,121, which is a division of application No. 12/017,413, filed on Jan. 22, 2008, now Pat. No. 7,578,201, which is a division of application No. 11/283,022, filed on Nov. 17, 2005, now Pat. No. 7,343,816, which is a division of application No. 10/443,193, filed on May 22, 2003, now Pat. No. 6,993,981.

(60) Provisional application No. 60/383,023, filed on May 24, 2002.

(56) References Cited

U.S. PATENT DOCUMENTS

| | | |
|---|---|---|
| 4,911,579 A | 3/1990 | Lutz et al. |
| 4,939,939 A | 7/1990 | Vemmer |
| 5,115,146 A | 5/1992 | McClure |
| 5,259,252 A | 11/1993 | Kruse et al. |
| 5,392,660 A | 2/1995 | Hodson et al. |
| 5,417,120 A | 5/1995 | Hulsing, II |
| 5,439,320 A | 8/1995 | Abrams |
| 5,557,258 A * | 9/1996 | Eslambolchi ............... 340/540 |
| 5,712,424 A | 1/1998 | Reed |
| 5,961,252 A | 10/1999 | Mercer et al. |
| 6,195,922 B1 * | 3/2001 | Stump ............... 37/348 |
| 6,252,538 B1 | 6/2001 | Chignell |
| 6,351,341 B1 | 2/2002 | Lee et al. |
| 6,470,976 B2 | 10/2002 | Alft et al. |
| 6,554,082 B2 | 4/2003 | Bischel et al. |
| 6,655,464 B2 | 12/2003 | Chau et al. |
| 6,975,942 B2 | 12/2005 | Young et al. |
| 6,993,981 B1 | 2/2006 | Chau et al. |
| 7,343,816 B2 | 3/2008 | Chau et al. |
| 7,578,201 B2 | 8/2009 | Chau et al. |
| 7,775,121 B2 * | 8/2010 | Chau et al. ............... 73/826 |
| 8,042,407 B2 | 10/2011 | Chau et al. |
| 2002/0112893 A1 | 8/2002 | Bischel et al. |
| 2003/0012411 A1 | 1/2003 | Sjostrom et al. |
| 2004/0028476 A1 | 2/2004 | Payne et al. |
| 2007/0011271 A1 | 1/2007 | Baker et al. |

* cited by examiner

TENSION MONITORING ARRANGEMENT AND METHOD

RELATED APPLICATION

The present application is a continuation application of co-pending application Ser. No. 13/251,807 filed Oct. 3, 2011; which is a continuation application of application Ser. No. 12/835,100 filed Jul. 13, 2010 and issued as U.S. Pat. No. 8,042,407 on Oct. 25, 2011; which is a continuation application of application Ser. No. 12/506,986 filed Jul. 21, 2009 and issued as U.S. Pat. No. 7,775,121 on Aug. 17, 2010; which is a divisional application of application Ser. No. 12/017,413 filed Jan. 22, 2008 and issued as U.S. Pat. No. 7,578,201 on Aug. 25, 2009; which is a divisional application of application Ser. No. 11/283,022, filed on Nov. 17, 2005 and issued as U.S. Pat. No. 7,343,816 on Mar. 18, 2008; which is a divisional application of application Ser. No. 10/443,193, filed on May 22, 2003 and issued as U.S. Pat. No. 6,993,981 on Feb. 7, 2006; which claims priority from U.S. Provisional Application Ser. No. 60/383,023, filed on May 24, 2002; all of which are incorporated herein by reference.

BACKGROUND OF THE INVENTION

The invention relates generally to the field of tension monitoring during installation of underground utilities. As an example, the method and apparatus of the present invention may be used in the tension monitoring arrangement described in U.S. Pat. No. 5,961,252 (hereinafter the '252 patent) which is incorporated herein by reference. FIG. 3 of the '252 patent illustrates an installation operation in progress during which a utility is pulled through a previously formed pilot bore. Tension is monitored using a tension monitoring arrangement 60. FIG. 5 of the '252 patent schematically illustrates the tension monitoring arrangement used in the operation of FIG. 3.

SUMMARY OF THE INVENTION

As will be described in more detail hereinafter there is disclosed herein a system for installing an underground utility by retraction that is applied to a leading end of the utility to draw the utility through the ground such that the utility is subjected to a tension force.

In one aspect of the present invention, a sensing arrangement is used for sensing the tension force that is applied to the leading end of the utility to produce a sensor signal. An amplifier arrangement uses the sensor signal to generate an amplified output signal. A compensation arrangement applies a compensation voltage to the amplifier arrangement for shifting the amplified output signal.

In another aspect of the present invention, the system includes an inground tension monitoring arrangement having a processing arrangement which receives electrical power from a power supply in a way which may subject the processing arrangement to a loss of power that is temporary during system operation, as well as a shut-down loss of power condition, either of which causes the processing arrangement to reset. The system further includes a first arrangement for producing an output signal that is responsive to a time duration of the loss of power. A second arrangement cooperates with the processing arrangement for using the output signal to establish whether a particular reset is responsive to a power supply bounce condition during operation. In one feature, the processing arrangement is configured for saving at least one system start-up parameter at an initial system start-up and is further configured for re-entering a run mode responsive to establishing that the particular reset is responsive to the power supply contacts bounce condition, while retaining the system start-up parameter.

In still another aspect of the present invention, the system includes a sensing arrangement for inground sensing of the tension force that is applied to the leading end of the utility to produce a sensor signal such that a zero tension sensed value may be offset from a zero voltage. An amplifier arrangement uses the sensor signal to generate an amplified output signal such that a zero tension amplified output is produced responsive to the zero tension sensed value. Processing means is configured for measuring the amplified output signal at least in a way which measures the zero tension amplified output responsive to powering on the sensing arrangement and the amplifier arrangement, and for saving the zero tension amplified output. In one feature, the processing means is configured for issuing a ready for calibration signal after saving the zero tension amplified output and the system includes inground transceiver means for transmitting the ready for calibration signal to an above ground location.

In yet another aspect of the present invention, a tension monitoring apparatus is provided including sensing means for inground sensing of the tension force that is applied to the leading end of the utility to produce a sensor signal during the installation time period. Data means is used at least for storing an original digital data set responsive to the sensor signal, during the installation time period and for copying the original data set to a different data location to create a copied data set after the installation time period. A user interface arrangement, in communication with the data means, permits erasing the original data set only after the original data set has been copied to the different data location. In one feature, the data means is configured for creating the original data set in a way which provides for detection of any alteration of the copied data set at the different data location.

In a further aspect of the present invention, a tension monitoring apparatus includes sensing means for sensing the tension force to produce a tension signal. Electronic means is provided for using the tension signal. Battery means is provided for supplying electrical power to the electronic means. Housing means supports the sensing means in a way that exposes the sensing means to the tension force and further defines an elongated chamber between a pair of opposing, first and second ends. The housing means being electrically conductive and a first one of the ends being configured for receiving the tension force such that the tension force is transferred through the housing means to the second one of the ends for then transferring the tension force to the utility. The electronic means is positionable in the chamber with the battery means such that the housing means serves as at least a portion of an electrical circuit for supplying the electrical power to the electronic means from the battery means. In one feature, the electronic means is further configured for at least one of recording the tension force, based on the tension signal, and transmitting the tension force to an aboveground location. In another feature, the elongated chamber is at least generally cylindrical in shape having a chamber diameter that is defined by an interior chamber surface and the battery means includes at least one battery cell that is cylindrical in shape so as to define an outer cylindrical surface and the battery cell is received in the elongated chamber such that the outer cylindrical surface of the battery cell is supported directly against the interior chamber surface.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
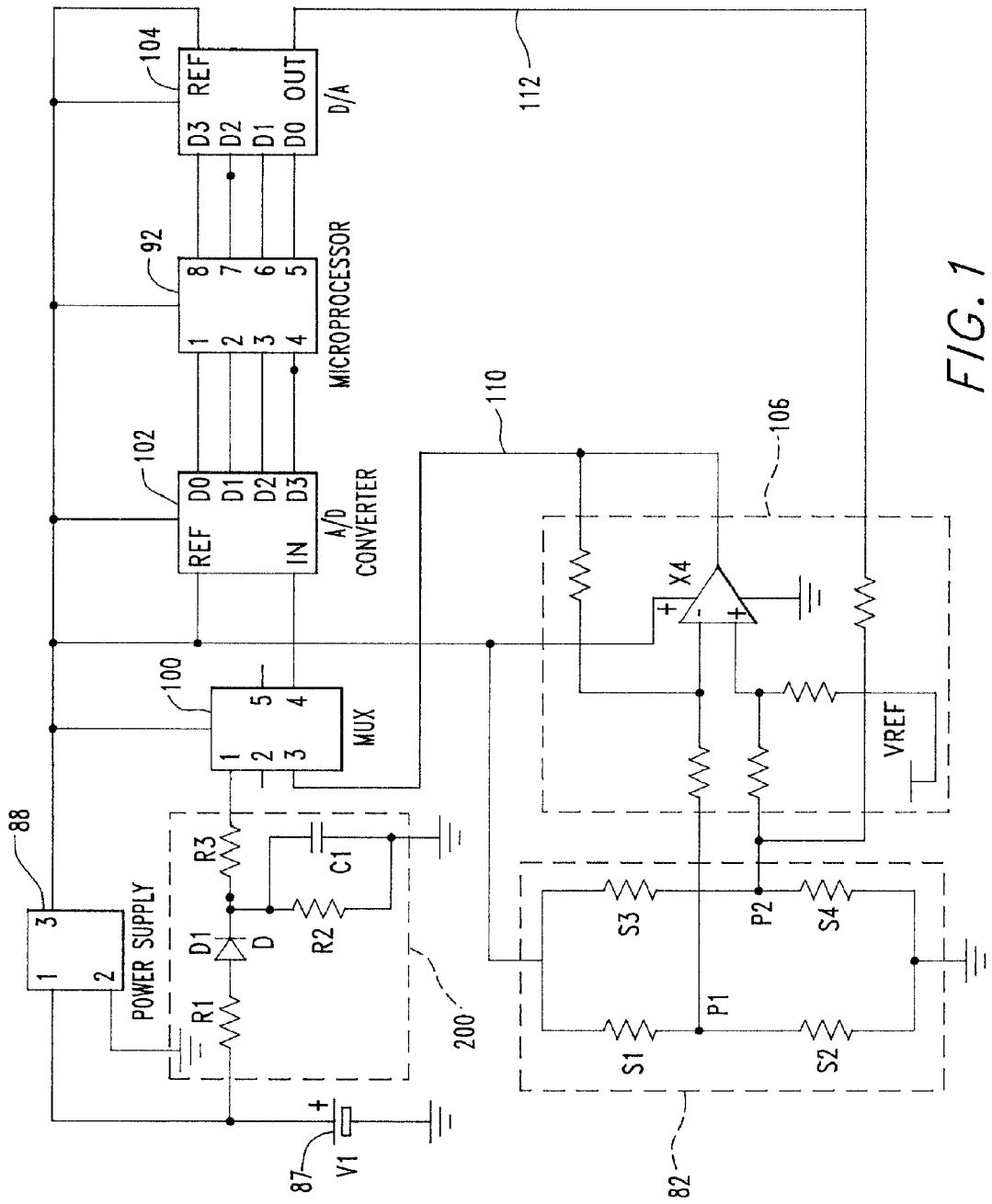
FIG. 1 is a schematic diagram of one embodiment of the tension monitoring arrangement of the present invention, shown here for purposes of illustrating its highly advantageous configuration.

Turning now to the figures of the present application, wherein reference numbers of the '252 patent have been applied to like components where possible, attention is immediately directed to FIG. 1. This figure illustrates a portion of the arrangement of components shown by FIG. 5 of the '252 patent including strain gauge arrangement 82 (within a dashed box), battery 87, power supply 88 and CPU 92. Additional components are shown including a multiplexer 100, an analog to digital converter (A/D) 102, a digital to analog converter (D/A) 104, a differential amplifier arrangement 106 (within a box) having (+) and (−) inputs that are connected to strain gauge arrangement 82 at P1 and P2, respectively. It is noted that component additions may not be required, in order to practice the present invention, where previously installed components have unused capacity which may be pressed into service. For example, multiplexer 86 of FIG. 5 in the '252 patent may serve in place of multiplexer 100 of FIG. 1 of the present application. In this regard, identity of components is not required so long as functional equivalence is achieved in view of the teachings herein. It is noted that the plus (+) and minus (−) amplifier input markings were inadvertently reversed in FIG. 1 of the above incorporated provisional application. While this has been corrected, along with a few typographical changes in this description, it is submitted that one of ordinary skill in the art would immediately reverse the markings in view of the functionally described differential amplifier configuration that is clearly in use.

Continuing to refer to FIG. 1, strain gauge arrangement 82 is made up of strain gauges S1-S4 in an H bridge configuration. As an example, in considering tension monitoring, strain gauges S1 and S4 may be oriented along the axis of pull with S2 and S3 oriented orthogonal thereto. Accordingly, S1 and S4 stretch responsive to pulling the utility being installed. Voltage at P1 will decrease, while voltage at P2 will increase. The decrease and increase in voltages at these respective connections comprise inputs to differential amplifier 106 which, in turn, cooperate to provide an output responsive to tension. This tension output is sent to multiplexer 100 channel 3 input on a line 110 for conversion to digital form and is selectively available to processor 92. Strain gauges S2 and S3, in the present example, being oriented orthogonally with respect to the axis of pull, are not subjected to pulling tension but may be used advantageously for purposes such as temperature compensation. Of course, the present invention contemplates that alternative arrangements of the various strain gauges may be employed which result in different tension orientations with respect to each individual one of the strain gauges.

While it is sometimes desirable for strain gauge arrangement 82 to provide a voltage output of zero volts in the absence of any pulling tensions, it should be appreciated that such a strain gauge arrangement typically does not exhibit a zero offset. That is, the output at zero pull taken between P1 and P2 is offset from the desired zero volt value, as provided to the inputs of differential amplifier arrangement 106. Moreover, as will be seen, it may at times be desirable to provide an offset voltage at the input of the differential amplifier arrangement for purposes of increasing dynamic range, for example, with respect to pulling force. These and other desired offset conditions are encompassed by the concept of a compensation offset signal to be provided to the input of the differential amplifier in a way which produces a desired offset in the output of the differential amplifier, as described immediately hereinafter.

Still referring to FIG. 1, a compensation line 112 is connected from digital to analog converter 104 to the connection point between S3 and S4 (P2) and is thereby capable of influencing one input of the differential amplifier arrangement in a desired manner so as to provide a compensation offset signal. In this way, a target offset value can be provided at the input of the differential amplifier arrangement. For example, microprocessor 92 may provide digital data to digital to analog converter 104 which then provides an analog voltage output that is tailored to cause the differential amplifier arrangement to output a value of zero volts despite an offset voltage at the output of the strain gauge arrangement. Generally, in this arrangement, the (+) input of the differential amplifier is biased at approximately one-half of the power supply voltage.

Moreover, it should be appreciated that compensation line 112 may readily be used to apply compensation in a way that produces some other desired target offset in the output of the differential amplifier. For instance, the desired offset may be intended to increase dynamic range. That is, for example, where only tension monitoring is of interest, an offset at the differential amplifier inputs may deliberately be produced which allows the voltage that is induced by tension in the strain gauge arrangement to produce a larger voltage swing in a known direction. As a specific example, the (+) input of the differential amplifier may be biased downward to a value that is less than one-half of the supply voltage value for this purpose. Accordingly, highly advantageous offset compensation has been provided.

During any pulling operation directed to installing an underground utility, the tension monitoring arrangement may be subjected to significant values of mechanical shock and/or vibration. Where battery 87 is installed in a battery compartment and may be comprised of one or more cells which are spring biased toward one another, it should be appreciated that momentary power interruptions or disconnections may be induced by such shock and vibration. It is recognized herein that such momentary power interruptions may produce conditions under which microprocessor 92 is reset during the drilling operation. In this regard, system calibration with respect to pulling tension is generally performed at system startup under controlled conditions with one or more selected values of tension applied to the drill string and the tension monitoring arrangement. It is further recognized that startup procedures may be initiated responsive to a battery bounce reset in the absence of appropriate provisions. For example, a start-up calibration procedure might be initiated which could replace valid calibration data or zero offset with erroneous data. The apparatus and method of the present invention are configured for advantageously distinguishing such momentary power disconnections from initial power up or start up conditions, as will be described immediately hereinafter.

Continuing to refer to FIG. 1, a highly advantageous detection arrangement 200 is illustrated within a dashed line. Detection arrangement 200 includes resistors R1-R3, diode D1 and a capacitor C1. It is considered that one of ordinary skill in the art may readily select component values in view of this overall disclosure. This detection arrangement serves the purpose of distinguishing between momentary power interruptions and system start up conditions. To that end, when battery 87 is connected to the system at start up, the battery will charge C1 through R1 and the diode D1. If it is assumed that R1 is about the same resistance value as R2, and the time constant provided by the product R2\*C1 has a value of about a few seconds, when battery 87 is removed from the system for more than a few seconds (i.e., a shutdown condition), R2 will discharge C1, and the voltage to multiplexer 100 via A/D converter 102 will be proportional to $(1-\exp(-t/(R2*C1)))$, where t is the time in seconds. In this instance, the voltage on the channel 1 input of multiplexer 100 will be less that some predetermined threshold value based on system parameters. On the other hand, when the battery bounces, causing a system reset, the voltage at R3 (pin 1 of multiplexer 100) is about ½ of battery voltage minus one diode drop across D1 such that the voltage seen by the microprocessor is significantly higher than that voltage which is read after a system start up condition. Accordingly, when the microprocessor reads A/D 102 after a power-on reset or reset(s) due to battery bounce, it is able to distinguish between a just installed battery (low voltage at C1) and a reset caused by battery bounce (C1 voltage will be close to steady state voltage).

In accordance with the present invention, a startup calibration procedure or zero adjust offset measurement is applied only after the system is powered up and microprocessor 92 detects that the voltage at C1 is sufficiently low. That is, the voltage is detected before C1 is able to charge to a value above a predetermined minimum threshold through R1 indicating a start-up condition. As will be seen, the method employs an auto-zero on startup feature as well as a tension calibration feature using one or more non-zero tensions applied to the tension monitor.

Figure 2:
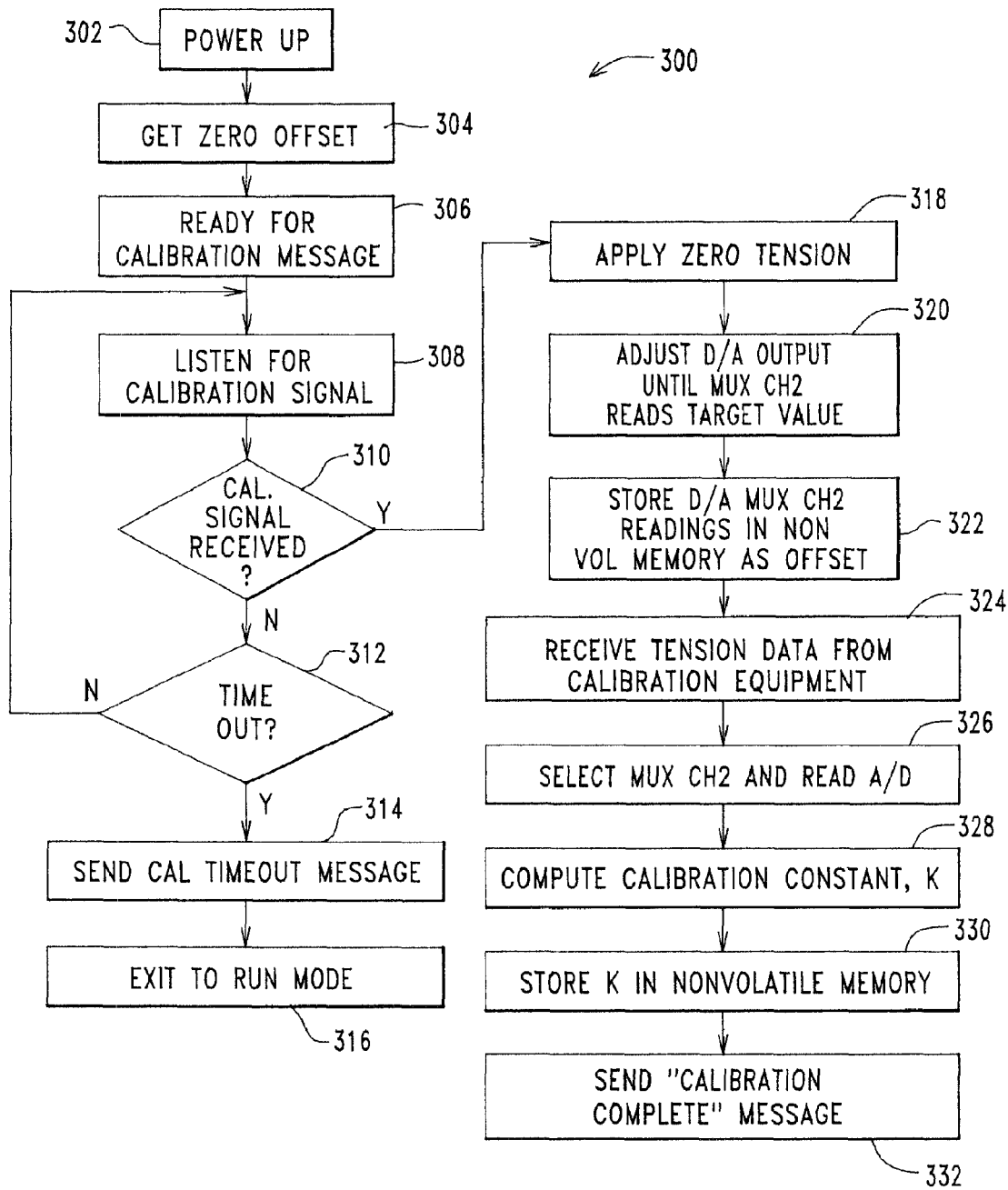
FIG. 2 is a flow diagram which illustrates one embodiment of a highly advantageous start-up and calibration procedure in accordance with the present invention.

Turning to FIG. 2, a highly advantageous start up and calibration method is generally indicated by the reference number 300. Method 300 is initiated at power-up step 302. Step 304 then measures the output of differential amplifier arrangement 106 with zero tension applied to the tension monitoring arrangement and stores the offset value. Thereafter, a "Ready for Calibration" message is transmitted in step 306 to an aboveground location which may comprise a receiver at the drill rig or a test fixture specifically directed to that purpose.

The receiver or test fixture then originates a response which may be referred to as a calibration signal. Step 308 is performed at the tension monitoring arrangement in which the latter listens for the calibration signal at a periodic interval. Step 310 tests for receipt of the calibration signal. As the system awaits the calibration signal, operation is transferred through decision step 312 which itself tests for the expiration of an overall time out interval anticipating receipt of the calibration signal. Where the time out interval has not expired, operation returns to step 308. Steps 308, 310 and 312 are continuously executed in a loop until expiration of the time out interval. Following expiration of the time out interval, step 314 sends a calibration time out message to the aboveground receiver, followed by step 316 in which operation is transferred into a normal run mode with the new zero offset value, an implementation of which is described below.

Returning to the description of step 310, when the calibration signal is received, step 318 is entered in which zero tension is applied to the drill string and tension monitoring arrangement. Step 320 then adjusts the output of digital to analog converter 104 so as to generate the compensation signal on line 112 to produce a target value output from the differential amplifier at the channel 3 input of multiplexer 100. The output of the digital to analog converter is adjusted repetitively until the target value is achieved. Thereafter, settings of the digital to analog converter which achieved the target value are stored by step 322 in nonvolatile memory. In step 324, tension applied to the tension monitoring arrangement by the drill string is adjusted to a nonzero value for calibration purposes. For example, a tension of 40,000 pounds may be applied to the tension monitoring arrangement. With this tension applied, step 326 is performed wherein microprocessor 92 selects the channel 3 input of multiplexer 100 to read the output of differential amplifier, as converted to digital form by analog to digital converter 102. In this regard, it should be appreciated that strain gauge response is at least generally linear. Therefore, a calibration constant may be obtained using a single nonzero tension value, however, it is to be understood that additional nonzero tension values may readily be used. With one or more nonzero tension values in hand, step 328 determines a calibration constant k for use in determining tension based on output of the differential amplifier. The calibration constant being determined as:

$$k = \frac{\text{applied tension}}{(A/D \text{ reading @ tension}) - \text{offset}}$$

Step 330 stores calibration constant k in nonvolatile memory. A "calibration complete" message is then transmitted, in step 322, to the receiver at an aboveground location such as, for example, receivers R1 and R2, as shown in FIG. 2 of the '252 patent, a drill rig receiver or a test fixture receiver.

Figure 3:
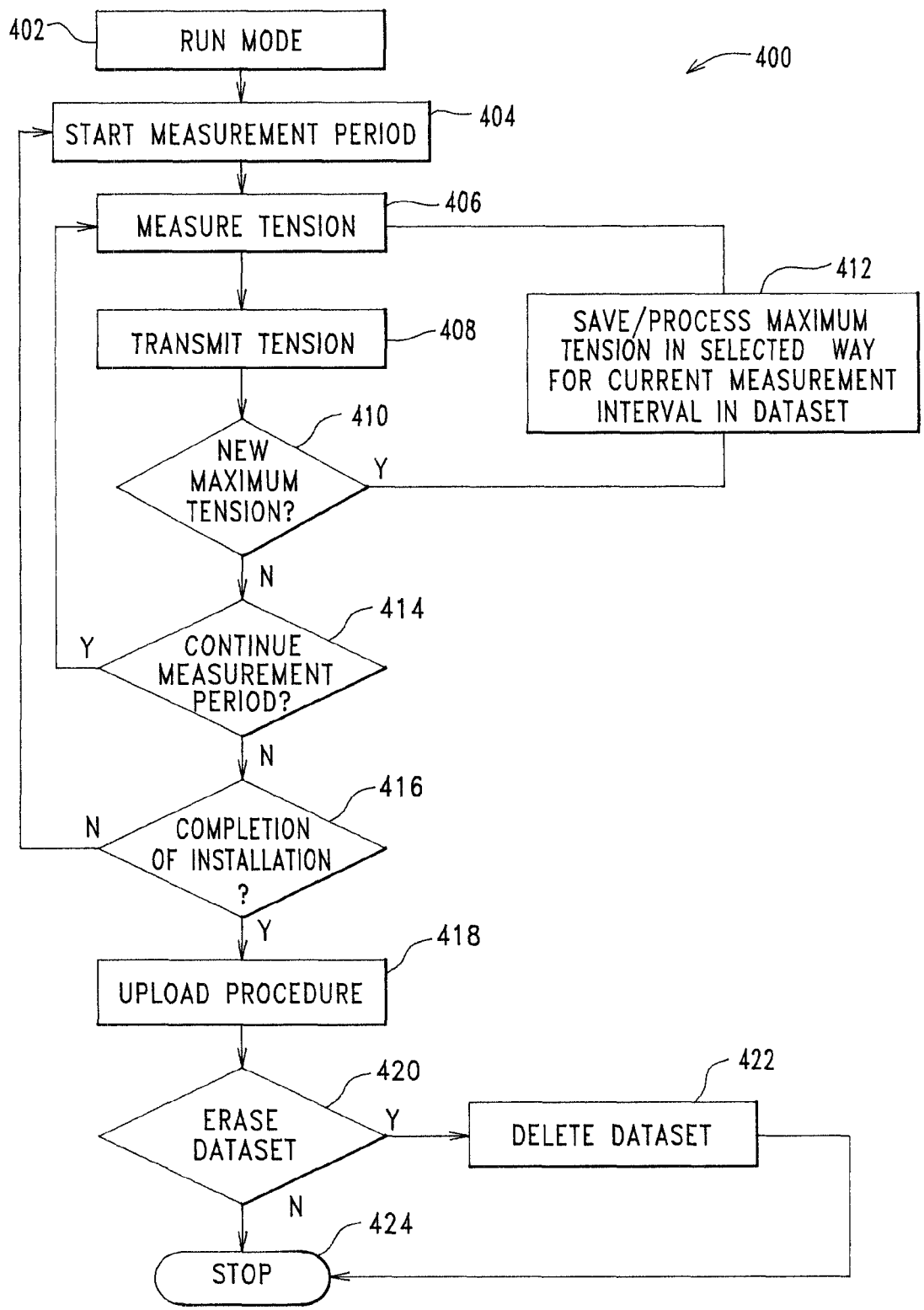
FIG. 3 is another flow diagram which illustrates one embodiment of run mode in accordance with the present invention.

FIG. 3 illustrates one potential implementation of the run mode, generally indicated by the reference number 400 and entered at step 402. In step 404, a measurement interval or period is initiated for the duration of which tension is monitored. In step 406, a tension value is measured by microprocessor 92 using the voltage value obtained from the channel 3 input of multiplexer 100 and the stored zero offset value. Step 408 may transmit this tension value, for example, to an aboveground receiver for use in displaying the tension value to an operator, comprising a display which is presented essentially in real-time. Step 410 determines whether the tension value just measured is a new maximum tension for the measurement interval which is currently underway. If the tension value is a new maximum, step 412 saves that value in a data set corresponding to the current measurement interval in a way which is described in further detail hereinafter.

If the tension value just measured is not a new maximum tension value for the interval underway, step 414 tests whether the measurement interval has concluded. If the measurement interval is ongoing, the process repeats, beginning with step 406. If, on the other hand, the current measurement interval has concluded, step 416 determines whether the overall installation operation has concluded. In the event that the installation operation is continuing, the process resumes by initiating a new measurement interval at step 404 and determining a maximum tension value for the new interval, as described above. If step 416 determines that the installation has concluded, step 418 initiates an upload procedure in which the data set produced by step 412 is copied to another location in a protected manner. Following the upload procedure of step 418, the data set may be erased in step 420 using step 422. Stop step 424 concludes the run mode. It should be appreciated that this installation procedure is advantageous at least for the reason that even a long installation run produces a data set of relatively limited size, since maximum interval values are stored. Moreover, the system may readily present an overall maximum value that is selected from the interval maximums. Of course, the data set may be presented in any number of suitable manners.

It should be appreciated that run mode procedure 400 does not afford an opportunity to alter or erase the data set prior to upload. Moreover, it is desirable to protect the data set from unauthorized alteration. In this regard, any number of techniques currently available or yet to be developed, may be employed even during step 412, which creates the data set and adds new values to it to prevent and/or detect data alteration. For example, the data set may be subjected to cyclic redundancy checking (CRC) wherein even the modification of a single bit is readily detected. Moreover, proprietary formats may be used or developed which may include encryption, either currently available or yet to be developed, that essentially eliminates the possibility of data alteration. In addition to proprietary formats, proprietary devices may be used to initially store the data set and/or to receive the upload of the data set. It is recognized herein that access to the data set is not particularly of concern so long as alteration of the data set is prevented.

Figure 4:
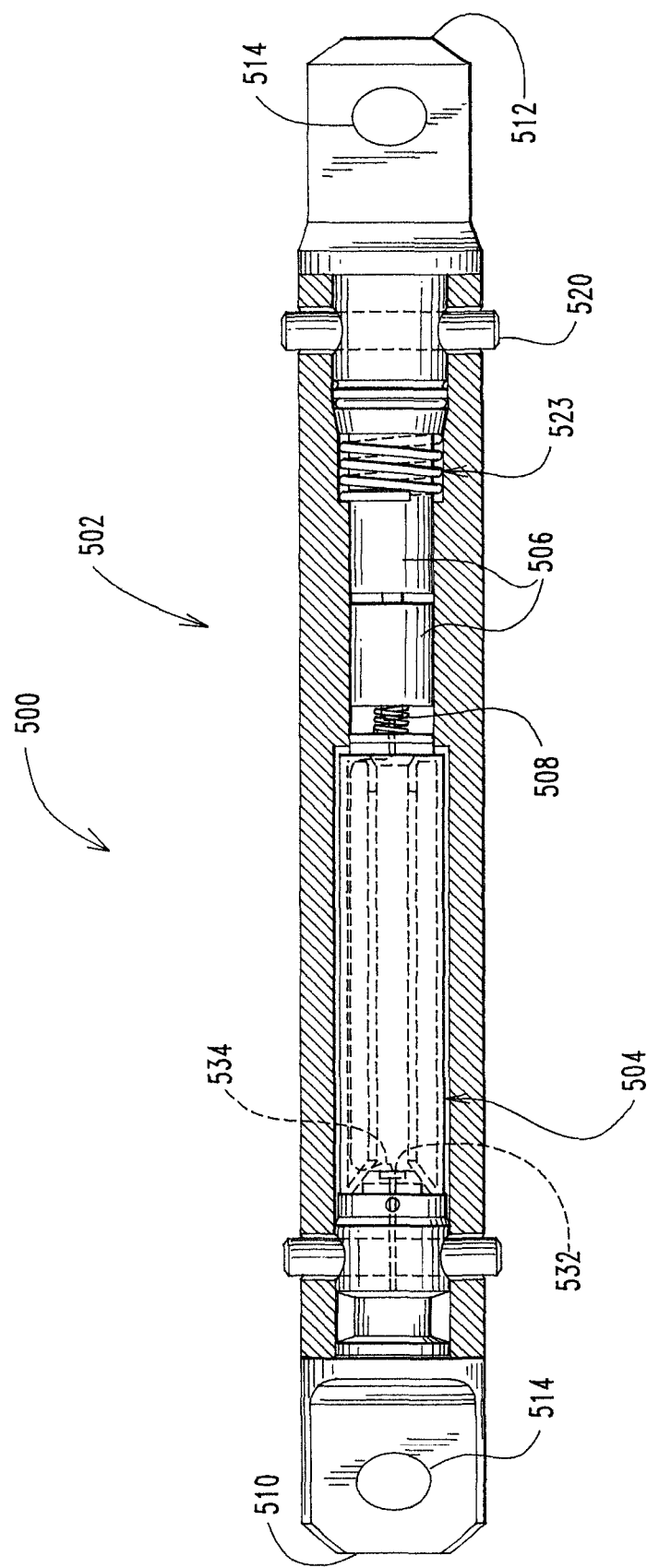
FIG. 4 is an partial cutaway view of one embodiment of the highly advantageous tension monitoring arrangement of the present invention, shown here to illustrate details of its structure.

Turning now to FIG. 4, a tension monitoring arrangement produced in accordance with the present invention is generally indicated by the reference number 500. Arrangement 500 includes a housing 502 having a transmitter arrangement 504 positioned therein. Housing 502 defines an innermost passage having a diameter which is sized to receive a pair of batteries 506 that are connected in series. In this particular example, D cell batteries are used, however any suitable type of battery may be used. Power is supplied to transmitter 504 at the end of one of the batteries nearest the transmitter using a spring biasing and electrical contact arrangement 508 which forms part of the transmitter arrangement, as will be seen in further detail in a subsequent figure. Opposing ends of the housing are closed using a pair of plug arrangements indicated by the reference numbers 510 and 512, each of which defines a pulling eye 514.

Figure 5:
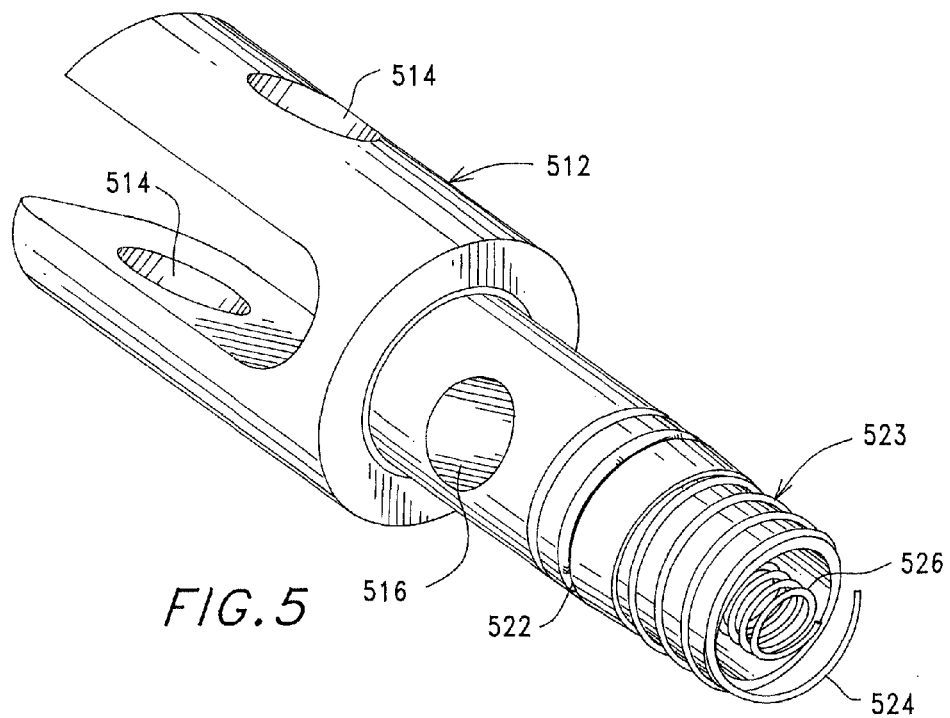
FIG. 5 is a perspective view of a first end fitting that is used in the tension monitoring arrangement of FIG. 4, shown here to illustrate details of its structure, particularly with respect to providing battery power to an electronics package that is housed within the tension monitoring arrangement.

Referring to FIG. 5 in conjunction with FIG. 4, plugs 510 and 512 are similar in defining a through hole 516 (FIG. 5) that is configured for receiving a pin 520 (FIG. 4) through cooperating holes defined in housing 502 so as to hold the plugs in position. O-ring seals 522 (FIG. 5) are used to seal the plugs against housing 502.

Plug 512 includes a spring contact arrangement 523 made up of a housing contact spring 524 and an inner, battery contact spring 526 both of which are best viewed in FIG. 5. Housing 502 defines a recess that is configured for receiving housing contact spring 524 so as to form an electrical contact between the housing contact spring and housing 502. Battery contact spring 526 places a resilient bias against a nearest one of batteries 506 and forms an electrical contact with its end terminal. At the same time, battery contact spring 526 is electrically connected to plug 512.

Figure 6:
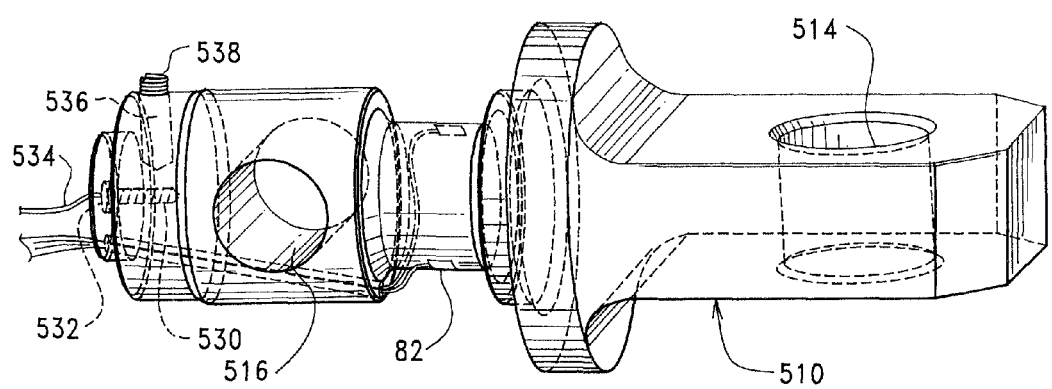
FIG. 6 is a perspective view of a second end fitting that is used in the tension monitoring arrangement of FIG. 4, opposite the first end fitting of FIG. 5, shown here to illustrate details of its structure, again with respect to providing battery power to an electronics package that is housed within the tension monitoring arrangement as well as positioning and support of strain gauges that are used to sense tension force being applied to a utility.
Figure 7:
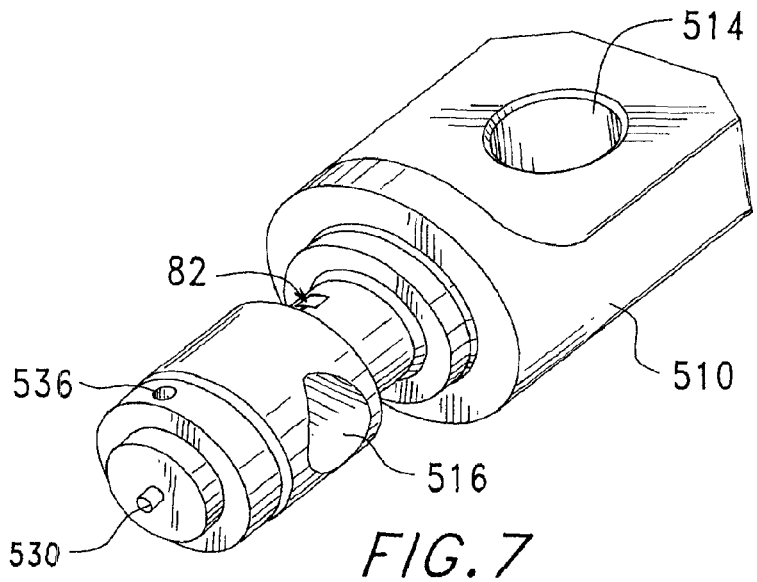
FIG. 7 is another perspective view of the second end fitting of FIG. 6, shown here to illustrate further details of its structure.

Referring to FIGS. 4, 6 and 7, plug 510 is illustrated including its highly advantageous configuration with respect to delivering power to transmitter arrangement 504 from batteries 506. To that end, plug 510 includes a fastener receptacle 530 which may be configured for receiving a threaded fastener 532 or any suitable type of fastener. An electrical connection such as, for example, a wire 534 provides an electrical connection to transmitter arrangement 504. Any number of different forms of electrical connection may be employed as an alternative between plug 514 and the transmitter including, for example, spring biasing. A recess 536 is formed in the sidewall of plug 510 for receiving a coil spring 538 (FIG. 6). When plug 510 is installed in housing 502, spring 538 is captured between the plug and housing so as to form an electrical connection therebetween. It should be appreciated that additional recesses 536 and springs 538 may readily be used to enhance electrical connectivity.

In view of the features described above, electrical power is supplied from the battery using housing 502 in cooperation with end plugs 510 and 512 in a highly advantageous manner. In particular, this configuration, wherein the housing is used as an electrical path, optimizes the strength of the housing by avoiding the need for a separate battery compartment which would result in reduced thickness of the housing wall and by allowing for greater battery diameter and thereby increased power capacity.

Figure 8:
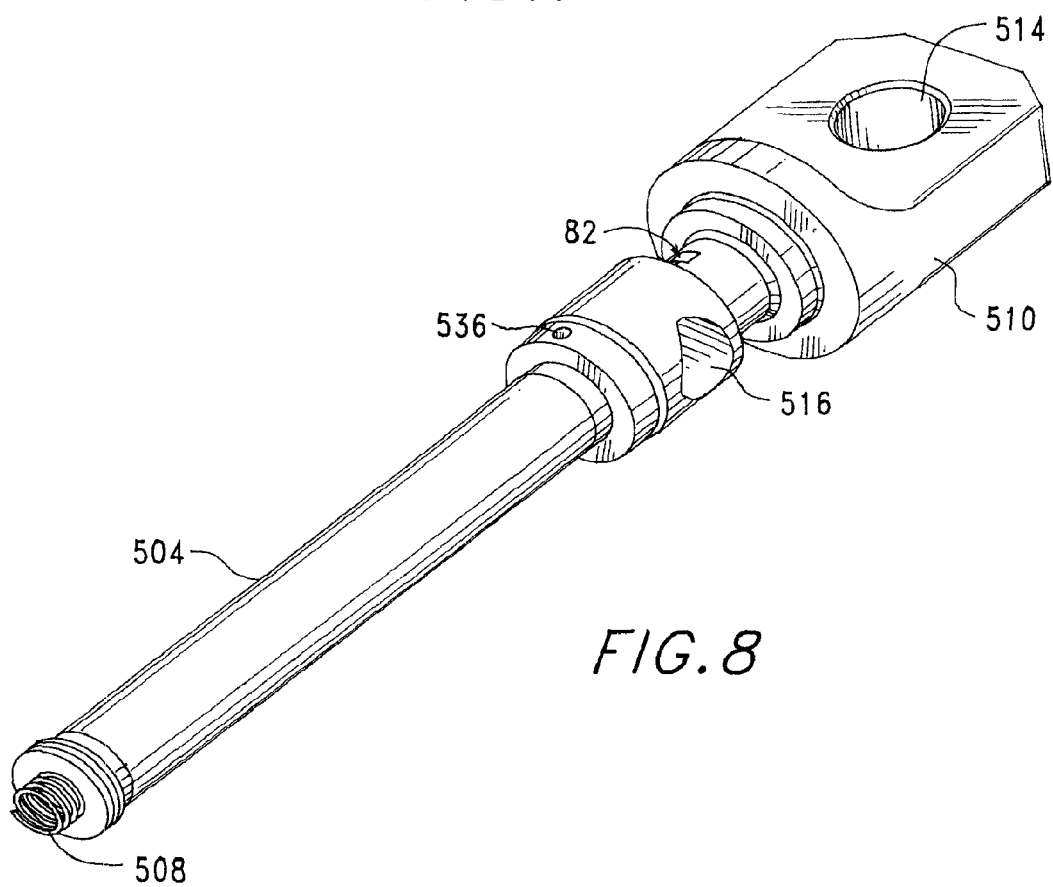
FIG. 8 is a perspective view of the end fitting of FIGS. 6 and 7 shown positioned adjacent to the electronics package.

FIG. 8 illustrates plug 510 positioned adjacent to transmitter 504 to further illustrate details of its structure including spring biasing and electrical contact arrangement 508.

Figure 9:
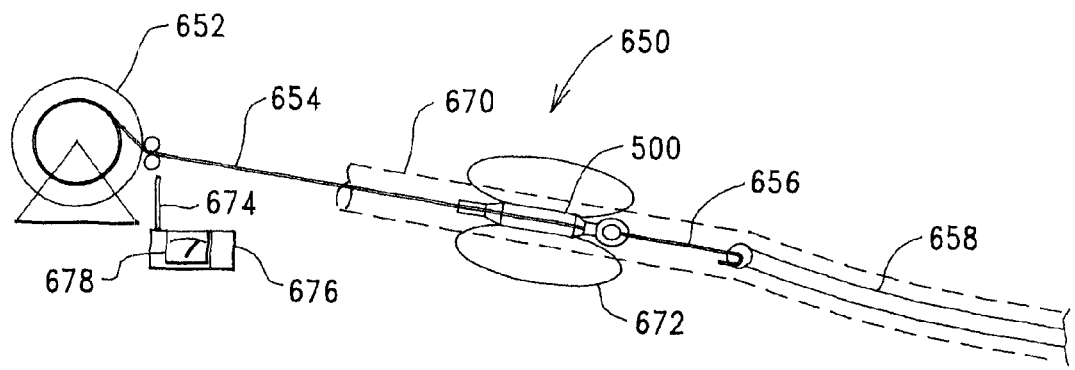
FIG. 9 is a diagrammatic view, in elevation, shown here to illustrate the use of the tension monitoring arrangement of the present invention in a winching configuration.

It should be appreciated that the highly advantageous tension monitoring arrangement of the present invention may be used in systems other that in conjunction with being pulled using a drill rig and drill string. FIG. 9 diagrammatically illustrates one such alternative system generally indicated by the reference number 650. System 650 includes a winch 652 arranged for pulling a winch cable 654. The latter is attached to tension monitoring arrangement 500 in a way which transfers winching tension to a cable extension 656 that is attached to a pulling object 658. This attachment may be accomplished, for example, using a Kellum's grip, as is known in the art. Pulling object 658 may comprise any suitable elongated member including an electrical power cable or pipe. The objective of the task may be, for example, to pull the elongated member through a pathway, shown in phantom using a dashed line, that is defined, for example, by a conduit or raceway either underground, aboveground, in a building or otherwise. Upon completion of the installation, the tension data set can be downloaded as described above. If desired, tension monitoring arrangement 500 may transmit an electromagnetic signal 672 which may include, for example, real time tension values. Signal 672 may be received by an antenna 674 of a portable receiver 676. The latter may include any suitable form of a display 678 for illustrating the tension value. Moreover, aural and/or visual warnings may be provided, if a maximum tension is about to be exceeded.

Figure 10:
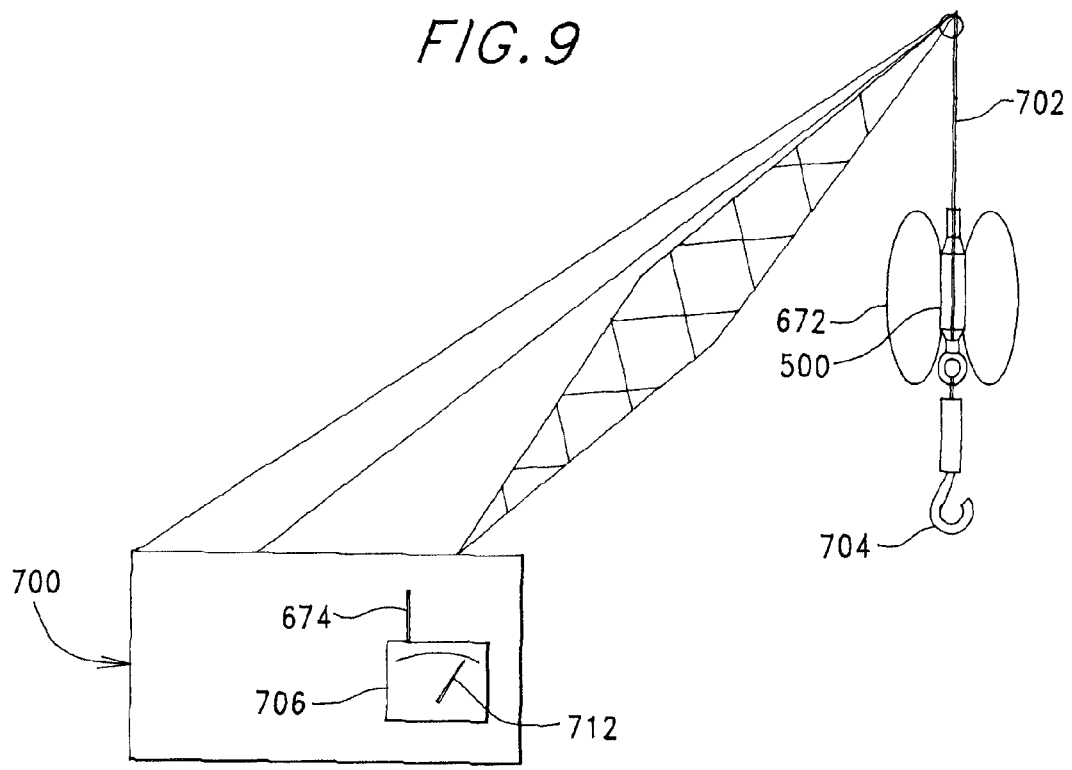
FIG. 10 is a diagrammatic view, in elevation, shown here to illustrate the use of the present invention for monitoring tension as applied by a crane.

Attention is now directed to FIG. 10 for purposes of further describing the broad range of tension monitoring tasks to which the tension monitoring arrangement of the present invention is well-suited. In particular, a crane 700 is diagrammatically illustrated having a lifting cable 702 wherein tension monitoring arrangement 500 is installed so as to be subjected to all lifting forces that are applied to a hook 704. Again, tension data can be downloaded at the conclusion of a particular task. If desired, a receiver 706 may be located in a cab 708 of the crane for receiving transmitted data 672 from tension monitoring arrangement 500 so as to provide a crane operator (not shown) a real time display 712 of lifting force.

Since the system and apparatus of the present invention disclosed herein may be provided in a variety of different configurations and the associated method may be practiced in a variety of different ways, it should be understood that the present invention may be embodied in many other specific ways without departing from the spirit or scope of the invention. For example, it is to be understood that the described apparatus and methods, are not limited to use in tension monitoring configurations, may be practiced in many other alternative and equivalent forms relating, for example, to offset compensation, resolving battery bounce conditions, as well as related reset considerations, data set protection and the use of a housing for power supply purposes with attendant advantages. Therefore, the present examples and methods are to be considered as illustrative and not restrictive, and the invention is not to be limited to the details given herein, but may be modified within the scope of the appended claims.

What is claimed is:

1. In a system for installing an underground utility by retraction that is applied to a leading end of the utility to draw the utility through the ground such that the utility is subjected to a tension force during an installation time period, a tension monitoring apparatus, comprising:
   a sensor for inground sensing of the tension force that is applied to the leading end of the utility to produce a sensor signal during said installation time period;
   a processor configured at least for storing an original digital data set responsive to said sensor signal during the installation time period and for copying the original data set to a different location to create a copied data set after said installation time period; and
   a user interface, in communication with the processor, to permit a user to instruct the processor to erase the original data set only after the original data set has been copied to the different location.

2. The apparatus of claim 1 wherein said processor is configured for creating said original data set in a way which provides for detection of any alteration of the copied data set at said different location.

3. The apparatus of claim 1 wherein the processor is configured for monitoring said sensor signal over a plurality of measurement periods which make up said installation time period.

4. The apparatus of claim 3 wherein the processor is configured for storing and identifying, as part of said original data set, a maximum tension value that is recorded for each one of said measurement periods.

5. The apparatus of claim 4 wherein said processor is configured for creating said original data set and adding each maximum tension value thereto in a way which provides for detection of any alteration of the copied data set at said different location.

6. The apparatus of claim 5 wherein said processor is configured for applying cyclic redundancy checking to the original data set with the addition of each maximum tension value such that cyclic redundancy checking can be used on the copied data set at the different location to confirm integrity thereof.

7. The apparatus of claim 3 wherein said processor is configured for determining a series of tension values over each measurement period and the apparatus includes a transmitter for transmitting at least selected ones of the tension values to an aboveground location.

8. In a system for installing an underground utility by retraction that is applied to a leading end of the utility to draw the utility through the ground such that the utility is subjected to a tension force during an installation time period, a method comprising:
   sensing the tension force inground that is applied to the leading end of the utility to produce a sensor signal during said installation time period;
   storing an original digital data set, responsive to said sensor signal during said installation time period;
   copying the original data set to a different location to create a copied data set after said installation time period; and
   permitting a user to instruct the processor to erase the original data set only after the original data set has been copied to the different location.

9. The method of claim 8 wherein said storing creates said original data set in a way which provides for detection of any alteration of the copied data set at said different location.

10. The method of claim 8, further comprising:
    monitoring said sensor signal over a plurality of measurement periods which make up said installation time period for use in producing the original data set.

11. The method of claim 10 wherein said storing stores and identifies, as part of said original data set, a maximum tension value that is measured for each one of said measurement periods.

12. The method of claim 11 wherein said storing includes initially creating said original data set and, thereafter, adding each maximum tension value thereto to provide for detection of any alteration of the copied data set at said different location.

13. The method of claim 12 wherein said storing includes applying cyclic redundancy checking to the original data set with the addition of each maximum tension value such that cyclic redundancy checking can be used on the copied data set at the different location to confirm integrity thereof.

14. The method of claim 10, further comprising:
    determining a series of tension values over each measurement period; and
    transmitting at least selected ones of the tension values to an aboveground location.

* * * * *